(12) United States Patent
Reynolds

(10) Patent No.: US 8,883,036 B2
(45) Date of Patent: Nov. 11, 2014

(54) HYDROGEN SULFIDE STREAM FOR CATALYST SULFIDATION FROM REFINERY RICH AMINES

(71) Applicant: Bruce Edward Reynolds, Martinez, CA (US)

(72) Inventor: Bruce Edward Reynolds, Martinez, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 148 days.

(21) Appl. No.: 13/801,029

(22) Filed: Mar. 13, 2013

(65) Prior Publication Data

US 2014/0264164 A1 Sep. 18, 2014

(51) Int. Cl.
*C01B 3/00* (2006.01)
*C01B 17/16* (2006.01)
*B01D 53/14* (2006.01)
*B01D 19/00* (2006.01)
*C09K 3/00* (2006.01)

(52) U.S. Cl.
CPC .............. *C09K 3/00* (2013.01); *B01D 19/0005* (2013.01); *B01D 53/1425* (2013.01); *B01D 53/1468* (2013.01); *C01B 3/00* (2013.01); *C01B 17/16* (2013.01); *B01D 2256/16* (2013.01); *B01D 2257/304* (2013.01)
USPC .......... 252/182.32; 95/263; 95/241; 423/229; 423/228; 423/226

(58) Field of Classification Search
CPC .......... B01D 19/0005; B01D 2256/16; B01D 2257/304
USPC ........ 252/182.32; 95/263, 241; 423/229, 228, 423/226
See application file for complete search history.

(56) References Cited

U.S. PATENT DOCUMENTS

| 4,152,217 | A | * | 5/1979 | Eisenberg et al. ................ 203/2 |
| 4,824,821 | A | | 4/1989 | Lopez et al. |
| 5,484,755 | A | | 1/1996 | Lopez |
| 6,071,484 | A | * | 6/2000 | Dingman et al. ............. 423/229 |
| 7,238,273 | B2 | | 7/2007 | Chen et al. |
| 7,410,928 | B2 | | 8/2008 | Chen et al. |
| 7,754,645 | B2 | | 7/2010 | Kuperman et al. |
| 2014/0091010 | A1 | * | 4/2014 | Banerjee et al. .............. 208/236 |

OTHER PUBLICATIONS

STIC Search Result Transcript received on Sep. 12, 2014.*
H. Hallie "Experience reveals best presulfiding techniques for HDS and HDN catalysts" Oil Gas J. Dec. 20, 1982, 69-74.

* cited by examiner

*Primary Examiner* — Harold Pyon
*Assistant Examiner* — Matthew Diaz
(74) *Attorney, Agent, or Firm* — Terrence Flaherty

(57) ABSTRACT

A process for the production of a $H_2S$-enriched $H_2$ gas stream without the need for $H_2S$ compression is disclosed. A slip stream of rich amine from a hydroprocessing unit is reduced in pressure and stripped with a hydrogen-containing gas. The $H_2S$ content of the resulting gas stream can be readily controlled by adjusting the stripping pressure and/or hydrogen rate. The $H_2S$-enriched $H_2$ gas stream is suitable for the sulfidation of catalytically active metals.

12 Claims, 2 Drawing Sheets

US 8,883,036 B2

HYDROGEN SULFIDE STREAM FOR CATALYST SULFIDATION FROM REFINERY RICH AMINES

TECHNICAL FIELD

This disclosure relates generally to the production of hydrogen sulfide-enriched hydrogen gas streams. These streams can be advantageously used for a variety of purposes such as sulfidation of catalytically active metals.

BACKGROUND

The petroleum industry is increasingly turning to heavy crudes, resids, coals and tar sands as sources for feedstocks. Feedstocks derived from these heavy materials contain more sulfur and nitrogen than feedstocks derived from more conventional crude oils, requiring a considerable amount of upgrading in order to obtain usable products therefrom. The upgrading or refining is accomplished by hydroprocessing processes, i.e., treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds.

Catalysts commonly used for these hydroprocessing reactions include materials such as cobalt molybdate on alumina, nickel on alumina, cobalt molybdate promoted with nickel, nickel tungstate, etc. U.S. Pat. Nos. 4,824,821 and 5,484,755 and 7,238,273 disclose hydroprocessing catalysts in the form of high activity slurry. The catalyst is produced from Group VIB metal compounds by sulfiding an aqueous mixture of the metal compounds with hydrogen sulfide (H2S) gas at a pressure of up to 5000 psi (34.5 MPa). U.S. Pat. Nos. 7,754,645 and 7,410,928 disclose a hydroprocessing catalyst and methods for making the catalysts, by reacting at least a Group VIB metal compound with a Promoter metal compound, sulfiding the intermediate mixture with a sulfiding agent, then mixing the sulfided catalyst precursor with a hydrocarbon diluent to make a bulk slurry type catalyst.

Catalyst sulfidation with an $H_2S$-containing hydrogen stream to make high activity slurry catalysts often requires elevated pressures and high $H_2S$ concentrations (e.g., from 5 to 30% $H_2S$ by volume). While hydrogen ($H_2$) is commonly available at sufficient pressure, $H_2S$ is normally not available at sufficient pressure. Compression of $H_2S$ or $H_2S$-containing $H_2$ gas streams at the high $H_2S$ concentrations required is expensive and creates undesirable health and safety issues. Furthermore, producing $H_2S$ on demand for such use is much more costly than if it can be obtained as a by-product from an oil refinery where it has no value.

Since a suitable high pressure $H_2S$-rich $H_2$ gas stream is not available in a typical refining facility, the current approach is to obtain $H_2S$ from an amine regenerator, mix it with $H_2$ and compress to the required pressure. This approach minimizes the cost of the $H_2S$, but does not avoid the cost and safety concerns of the $H_2S$-rich gas (e.g., sour gas) compression. Other high pressure $H_2S$-containing $H_2$ gas streams have insufficient and/or uncontrolled levels of $H_2S$ and often contain undesirable contaminants.

There is still a need for a process to directly create a $H_2S$-rich $H_2$ gas stream at the desired high pressure together with a convenient way to control the $H_2S$ concentration and the total rate without the need for sour gas compression. The various embodiments of this invention fulfill this need.

SUMMARY

In one aspect, the invention is a process for producing a hydrogen sulfide-enriched hydrogen gas stream suitable for catalyst sulfidation, comprising: (a) obtaining at least a portion of a high pressure sour gas stream comprising hydrogen sulfide from a hydroprocessing zone; (b) contacting the sour gas stream with an aqueous amine solution in a contacting zone to provide a hydrogen sulfide-depleted overhead gas stream and a hydrogen sulfide-enriched amine solution as an effluent bottoms stream; (c) contacting at least a portion of the hydrogen sulfide-enriched amine solution with hydrogen in a regeneration zone; and (d) recovering overhead from the regeneration zone, hydrogen sulfide-enriched hydrogen gas suitable for catalyst sulfidation.

In conventional processes, sour gas recycle streams from high pressure hydroprocessing units are contacted with an amine solution to absorb $H_2S$, the resulting $H_2S$-enriched amine is let down to very low pressure and regenerated in a heated column. However, this approach can only generate a low pressure $H_2S$ gas stream, which requires recompression. In one embodiment of the present invention, a slip stream of an $H_2S$-enriched amine at high pressure is let down to low pressure and stripped with hot $H_2$ gas to provide a $H_2S$-enriched hydrogen gas stream having sufficient $H_2S$ content and pressure that is suitable for catalyst sulfidation without the need for recompression.

One advantage of the process disclosed herein over conventional methods for producing $H_2S$-enriched $H_2$ gas streams is that the amount of $H_2S$ needed is a small fraction of what would be typically available in the rich amine solution from a typical refinery hydroprocessing unit. Another advantage of the process disclosed herein is that the $H_2S$ content of the produced $H_2S$-enriched hydrogen gas stream can be controlled, which facilitates its use in catalyst sulfidation.

DETAILED DESCRIPTION

Figure 1:
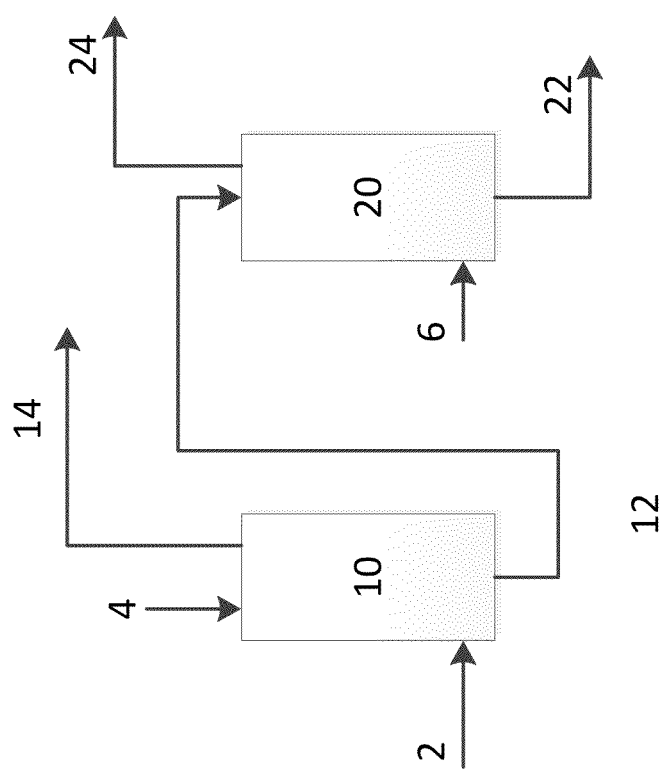
FIG. 1 is a block diagram illustrating one embodiment for preparing a hydrogen sulfide-enriched hydrogen gas stream.

FIG. 1 illustrates an embodiment to prepare a hydrogen sulfide-enriched hydrogen gas stream suitable for catalyst sulfidation. In FIG. 1 a contacting vessel 10 is shown. The contacting vessel can be of any suitable type for achieving intimate contact between a gas stream and a liquid stream. Suitable gas/liquid contactors are described in *Perry's Chemical Engineers' Handbook*, 8$^{th}$ Edition, Section 14 (2008) and include, for example, a tray or packed column or a gas scrubber.

A high pressure sour gas stream containing hydrogen sulfide ($H_2S$) is introduced through a gas inlet line 2 into a lower portion of the contacting zone 10 with an aqueous amine solution being introduced into an upper portion of the contacting zone 10 through an aqueous amine inlet line 4. A $H_2S$-depleted gas stream is removed through line 14 and passed to discharge, if suitably reduced in $H_2S$ content, for further processing, for use as a process stream and the like.

The source for the sour gas stream can be a recycle stream from any high pressure processing unit in the refinery of interest. As used herein, the term "high pressure" refers to a gas pressure of at least 1500 psig (10.3 MPa), e.g., from 1500 to 3000 psig (10.3 to 20.7 MPa). In one embodiment, the sour gas stream is a recycle stream from a hydrotreating zone. In another embodiment, the sour gas stream is a recycle stream from a hydrocracking zone.

In one embodiment, conditions in the contacting zone include a temperature of from 100° F. to 200° F. (38° C. to 93° C.).

In one embodiment, the sour gas stream contains from 1 to 10 vol. % $H_2S$ and from 50 to 90 vol. % hydrogen ($H_2$), with the remainder mostly light hydrocarbons (e.g., methane, ethane, propane, butane, etc.).

In one embodiment, an amine is present in the aqueous amine solution in an amount of from 5 to 60 wt. % (e.g., from 20 to 50 wt. %, or from 25 to 45 wt. %). Suitable amines include monoethanolamine (MEA), diethanolamine (DEA), triethanolamine (TEA), methyldiethanolamine (MDEA), diisopropanolamine (DIPA), diethylene glycolamine (DGA), 2-amino-2-methyl-1-propanol (AMP), tris(hydroxymethyl) aminomethane (Tris), and ethoxyethanol-tertiary-butylamine (EETB). In one embodiment, the amine is selected from the group consisting of monoethanolamine (MEA), diethanolamine (DEA), methyldiethanolamine (MDEA), diisopropanolamine (DIPA), and mixtures thereof. In another embodiment, the amine is diethanolamine (DEA).

In one embodiment, the $H_2S$-depleted gas stream has a total concentration of $H_2S$ of less than 35 ppmv (e.g., from 0.01 to 30 ppmv), or less 25 ppmv (e.g., from 0.01 to 20 ppmv), or less than 15 ppmv (e.g., from 0.01 to 10 ppmv, from 0.05 to 3.5 ppmv, or from 0.1 to 1 ppmv), based on the total gas stream.

Referring again to FIG. 1, a $H_2S$-enriched amine solution is withdrawn from the bottom of contacting zone 10 and introduced via line 12 into an upper portion of regeneration zone 20. Hydrogen is introduced through a gas inlet line 6 into a lower portion of the regeneration zone 20. At least a portion of the absorbed $H_2S$ gas is released upon contact of the $H_2S$-enriched amine solution with hydrogen to produce a semi-rich amine solution and a $H_2S$-enriched hydrogen gas stream. Semi-rich amine solution is removed through the bottom of the regeneration zone via line 22 for further processing. An overhead $H_2S$-enriched hydrogen gas stream is recovered from the upper portion of the regeneration zone 20 via line 24.

The source of hydrogen can be virtually any hydrogen-containing gas that does not include significant amounts of impurities. The hydrogen can be from a hydrogen plant, recycle gas in a hydroprocessing unit and the like.

In one embodiment, the $H_2S$-enriched amine solution has a sulfur to nitrogen mole ratio of from 0.20 to 0.50. In another embodiment, the $H_2S$-enriched amine stream has a sulfur to nitrogen mole ratio of from 0.35 to 0.45.

In one embodiment, the semi-rich amine solution has a sulfur to nitrogen mole ratio of less than 0.30. In another embodiment, the semi-rich amine solution has a sulfur to nitrogen mole ratio of from 0.10 to 0.30.

In one embodiment, conditions in the regeneration zone include a temperature of from 225° F. to 500° F. (107° C. to 260° C.) and a pressure of from 300 to 800 psig (2.1 to 5.5 MPa). In another embodiment, conditions in the regeneration zone include a temperature of from 240° F. to 275° F. (115° C. to 135° C.) and a pressure of from 400 to 600 psig (2.8 to 4.1 MPa).

In one embodiment, the hydrogen to $H_2S$-enriched amine flow rate ratio in the regeneration zone is from 0.010 to 0.020. In one embodiment, the hydrogen to $H_2S$-enriched amine flow rate ratio in the regeneration zone is from 0.010 to 0.015.

In one embodiment, the $H_2S$-enriched hydrogen gas stream comprises from 1 to 20 vol. % $H_2S$. In another embodiment, the $H_2S$-enriched hydrogen gas stream comprises from 5 to 10 vol. % $H_2S$.

Figure 2:
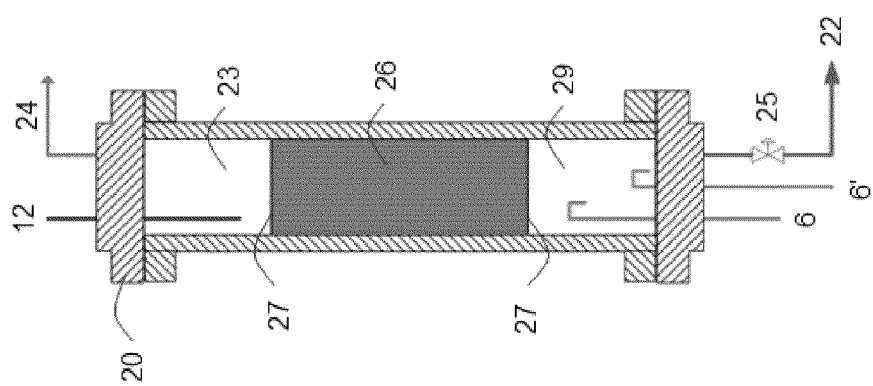
FIG. 2 is a schematic representation of a rich-amine stripper according to the present disclosure.

FIG. 2 is a schematic representation illustrating one embodiment of regeneration zone 20, wherein the regeneration zone is a rich amine stripper. The stripper is modified to serve as a packed column as well as a gas-liquid separator. The stripper is typically divided into a plurality of sections. For example, three sections are depicted in FIG. 2, namely a first section ("recovery section") 23, a second section ("amine stripping section") 26, and a third section ("gas-liquid separator section") 29. The amine stripping section 26 is disposed between the recovery section 23 and the gas-liquid separator section 29, with amine stripping section 26 in fluid communication with recovery section 23 and gas-liquid separator section 29. Solvent inlet line 12 and gas outlet line 24 are in fluid communication with the first section 23. The $H_2S$-enriched amine solution enters the first section 23 of the stripper through line 12.

The second section 26 includes one or more packing materials (not shown) disposed therein. As used herein, the term "packing material" can include, but is not limited one or more types of structured and/or random shaped materials. Suitable packing materials can include one or more metals, metal alloys, ceramics, composites or other non-metals, polymers, glass, or any combination thereof. Illustrative examples of commercially available structured packing includes, but are not limited to, FLEXIPAC® and GEMPAK® structured packings as manufactured by the Koch-Glitsch Corporation, Pro-Pak® structured packings as manufactured by Cannon Instrument Company, corrugated sheets, crimped sheets, gauzes, grids, wire mesh, monolith honeycomb structures, or any combination thereof. Screen supports 27 installed above and below the packing material hold it in place. In one embodiment, the rich-amine stripper 20 comprises from 40 to 60% packing material by volume.

Hydrogen gas enters the third section 29 of the stripper through lines 6 and 6'. Line 6 is positioned above the target liquid level in the gas-liquid separator section and below the packing material located in the second section of the stripper. Line 6' is submerged in liquid during normal operation. The hydrogen rate via each of lines 6 and 6' is set to about 50% of target rate for the conditions employed. The liquid level in the third section of the stripper is measured via a DPT cell (not shown) inside the third section level and provides valve 25 for the level control. Waste amine is removed through the bottom of the stripper via line 22 for further processing.

EXAMPLES

The following illustrative examples are intended to be non-limiting.

Examples 1-3

An $H_2S$-enriched amine stream was generated and stripped with hydrogen gas under three sets of conditions. The conditions and the properties of resulting $H_2S$-enriched hydrogen streams are set forth in Table 1.

TABLE 1

|  | Ex. 1 | Ex. 2 | Ex. 3 |
|---|---|---|---|
| Operating Conditions |  |  |  |
| Temp (° F.) | 257 | 258 | 258 |
| Pressure (psig) | 491 | 494 | 408 |
| Time on stream (d) | 5 | 5 | 4 |

TABLE 1-continued

|  | Ex. 1 | Ex. 2 | Ex. 3 |
|---|---|---|---|
| Fresh DEA Added to Reactor Unit | | | |
| Calculated Rate (g/h) | 1504 | 1493 | 1339 |
| DEA Content (wt. %) | 30 | 30 | 30 |
| $H_2$ to Stripper | | | |
| Rate (SCF/h) | 10.0 | 8.0 | 8.0 |
| DEA to Stripper | | | |
| Calculated Rate (g/h) | 1580 | 1574 | 1413 |
| S (wt. %) | 4.93 | 4.82 | 5.31 |
| S Loading (mol S/mol N) | 0.39 | 0.39 | 0.43 |
| DEA Exiting Stripper | | | |
| Measured Rate (g/h) | 1557 | 1548 | 1385 |
| S (wt. %) | 3.21 | 3.33 | 3.13 |
| S Loading (mol S/mol N) | 0.25 | 0.26 | 0.25 |
| Sulfur Mass Balance | | | |
| S to Stripper from Rich DEA (g/h) | 77.9 | 75.8 | 74.7 |
| S Out as $H_2S$ in Gas (g/h) | 22.0 | 24.2 | 26.9 |
| S Remaining in DEA (g/h) | 50.0 | 51.6 | 43.4 |
| S Mass Balance (%) | 92 | 100 | 94 |
| S Removal Ratio | 28.3 | 32.0 | 36.1 |
| $H_2S$-Rich $H_2$ Stream | | | |
| Rate (SCF/h) | 9.99 | 7.83 | 7.97 |
| $H_2S$ Content (vol. %) | 5.77 | 8.05 | 8.81 |

At the three conditions studied, hydrogen streams containing from 5.8 to 8.8 vol. % $H_2S$ were successfully produced. Moreover, such streams match the typical gas streams reliably used for the sulfidation of catalytically active metals. The results demonstrate that the $H_2S$ concentration can be controlled by adjusting the stripping pressure and/or hydrogen rate. Higher concentrations of $H_2S$ in the hydrogen stream can be obtained at lower pressure and/or hydrogen rate.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A process for producing a hydrogen sulfide-enriched hydrogen gas stream suitable for catalyst sulfidation, comprising:
    (a) obtaining at least a portion of a high pressure sour gas stream comprising hydrogen sulfide from a hydroprocessing zone;
    (b) contacting the sour gas stream with an aqueous amine solution in a contacting zone to provide a hydrogen sulfide-depleted overhead gas stream and a hydrogen sulfide-enriched amine solution as an effluent bottoms stream;
    (c) contacting at least a portion of the hydrogen sulfide-enriched amine solution with hydrogen in a regeneration zone; and
    (d) recovering overhead from the regeneration zone, a hydrogen sulfide-enriched hydrogen gas stream suitable for catalyst sulfidation.

2. The process of claim 1, wherein the hydroprocessing zone is a hydrocracking zone.

3. The process of claim 1, wherein conditions in the contacting zone include a temperature of 100° F. to 200° F. (38° C. to 93° C.) and a pressure of from 1500 to 3000 psig (10.3 to 20.7 MPa).

4. The process of claim 1, wherein an amine is present in the aqueous amine solution in an amount of from 20 to 50 wt. %.

5. The process of claim 4, wherein the amine is selected from the group consisting of monoethanolamine (MEA), diethanolamine (DEA), methyldiethanolamine (MDEA), diisopropanolamine (DIPA), and mixtures thereof.

6. The process of claim 1, wherein the hydrogen sulfide-enriched amine solution has a sulfur to nitrogen mole ratio of from 0.20 to 0.50.

7. The process of claim 1, wherein the hydrogen sulfide-enriched amine solution has a sulfur to nitrogen mole ratio of from 0.35 to 0.45.

8. The process of claim 1, wherein conditions in the regeneration zone include a temperature of from 225° F. to 500° F. (107° C. to 260° C.) and a pressure of from 300 to 800 psig (2.1 to 5.5 MPa).

9. The process of claim 1, wherein conditions in the regeneration zone include a temperature of from 240° F. to 275° F. (115° C. to 135° C.) and a pressure of from 400 to 600 psig (2.8 to 4.1 MPa).

10. The process of claim 1, wherein the hydrogen to hydrogen sulfide-enriched amine solution flow rate ratio in the regeneration zone is from 0.010 to 0.020.

11. The process of claim 1, wherein the hydrogen to hydrogen sulfide-enriched amine solution flow rate ratio in the regeneration zone is from 0.010 to 0.015.

12. The process of claim 1, wherein the hydrogen sulfide-enriched hydrogen gas stream comprises from 5 to 10 vol. % hydrogen sulfide.

* * * * *